US012709933B2

(12) United States Patent (10) Patent No.: US 12,709,933 B2
Branković et al. (45) Date of Patent: Aug. 18, 2026

(54) VEHICLE DOOR PROTECTION SYSTEM

(71) Applicant: NOVELIC DOO Beograd—Zvezdara, Belgrade (RS)

(72) Inventors: Veselin Branković, Belgrade (RS); Nenad Simic, Belgrade (RS); Veljko Mihajlović, Belgrade (RS); Darko Tasovac, Belgrade (RS)

(73) Assignee: NOVELIC DOO BEOGRAD—ZVEZDARA, Belgrade (RS)

( * ) Notice: Subject to any disclaimer, the term of this patent is extended or adjusted under 35 U.S.C. 154(b) by 0 days.

(21) Appl. No.: 18/789,023

(22) Filed: Jul. 30, 2024

(65) Prior Publication Data

US 2026/0002400 A1 Jan. 1, 2026

(30) Foreign Application Priority Data

Jun. 28, 2024 (EP) .................................... 24185504

(51) Int. Cl.
*E05F 15/43* (2015.01)
*E05F 15/42* (2015.01)

(52) U.S. Cl.
CPC ........ *E05F 15/43* (2015.01); *E05F 2015/483* (2015.01); *E05Y 2400/54* (2013.01); *E05Y 2900/531* (2013.01)

(58) Field of Classification Search
CPC ................ E05F 15/43; E05F 2015/483; E05Y 2400/54; E05Y 2900/531
USPC ........................................................... 701/49
See application file for complete search history.

(56) References Cited

U.S. PATENT DOCUMENTS

| | | | |
|---|---|---|---|
| 7,175,227 | B2 | 2/2007 | Menard |
| 7,686,378 | B2 | 3/2010 | Gisler et al. |
| 10,443,292 | B2 | 10/2019 | Baruco et al. |
| 11,434,683 | B2 | 9/2022 | Sabatini et al. |

(Continued)

FOREIGN PATENT DOCUMENTS

| | | | |
|---|---|---|---|
| CN | 108979440 | B | 5/2020 |
| CN | 107687298 | B | 9/2021 |

(Continued)

OTHER PUBLICATIONS

Baek et al., "Implementation of Deep Learning-based Kick Gesture Recognition Using 60 GHz Radar Sensor", 2024 IEEE Radar Conference (RadarConf24), May 6, 2024, pp. 1-6.

(Continued)

*Primary Examiner* — Muhammad Shafi
(74) *Attorney, Agent, or Firm* — NIXON & VANDERHYE

(57) ABSTRACT

The proposed innovative vehicle door protection system uses one radar sensor per vehicle side for door protection purposes, not being mounted on the vehicle door. They have a 180-degree field of view, and a specific radiation diagram in the elevation plane, pointed in the elevation at an angle larger than 60 degrees. Said proposed system executes related radar processing of the radar point cloud data on the sensing module, without utilizing domain controllers or a central processing unit, while still performing AI processing. Also, said proposed system is advantageously used for radar-based gestures control, supporting hand movements, and/or leg movements.

20 Claims, 5 Drawing Sheets

(56) References Cited

U.S. PATENT DOCUMENTS

| | | | | |
|---|---|---|---|---|
| 11,465,557 | B2 | 10/2022 | Mitchell et al. | |
| 2019/0128040 | A1 | 5/2019 | Mitchell | |
| 2020/0157873 | A1* | 5/2020 | Sabatini | E05B 81/76 |
| 2021/0262274 | A1 | 8/2021 | Schatz et al. | |
| 2022/0333422 | A1 | 10/2022 | Uebel et al. | |
| 2023/0184930 | A1* | 6/2023 | Trenkle | E05F 15/43 49/26 |
| 2024/0160211 | A1* | 5/2024 | Hong | G06V 20/56 |

FOREIGN PATENT DOCUMENTS

| | | | |
|---|---|---|---|
| DE | 102019130857 | A1 | 5/2020 |
| DE | 102020203376 | A1 | 9/2021 |
| JP | 4715910 | B2 | 7/2011 |

OTHER PUBLICATIONS

Extended European Search Report, issued in European Patent Application No. 24185504.8 dated Dec. 13, 2024.

* cited by examiner a)

b)

c)

a)

b)

VEHICLE DOOR PROTECTION SYSTEM

CROSS-REFERENCE TO RELATED APPLICATIONS

This application claims priority to EP Patent Application No. 24/185,504.8 filed Jun. 28, 2024, the entire contents of which are hereby incorporated by reference.

TECHNICAL FIELD

The present disclosure refers to a vehicle door protection system consisting of two mmWave radar sensor modules, each having a field of view of 180 degrees, one on each lateral side of the vehicle, having the capability to process the sensor data. The proposed system provides related information for opening vehicle doors, preventing them from being damaged when opening them. At the same time, the proposed system supports radar-based gesture sensing. The proposed system utilizes AI methodology for data processing, using radar point cloud data, calculated by said radar sensors.

STATE OF THE ART

The state of the art vehicle door protection systems are outlined in the following patents. Present-day state of the art vehicle door protection systems use cameras, lasers, ultrasound or radar sensors. If radar sensors are utilized for door protection, those systems are integrated into the vehicle door body, so that each door has a radar sensor. In some cases, corner-based radar systems are proposed, two per vehicle side.

The proposed innovative vehicle door protection system uses one radar sensor per vehicle side for door protection purposes, not being mounted on vehicle door, having 180 degree field of view, and specific radiation diagram in the elevation plane, pointed in the elevation in the angle larger than 30 degrees. The said proposed system executes related radar processing of the radar point cloud data on the sensing module, without utilizing domain controllers or a central processing unit, while still performing AI processing. Also, said proposed system is advantageously used for radar-based gestures controlling, supporting hand movements, and/or leg movements.

U.S. Pat. No. 7,175,227B2 A sensor system for vehicle doors that introduces a sensor system for protecting a door of a vehicle from damage includes an electronic sensor operable to detect when an object external to the vehicle is within close proximity to the door of the vehicle. The related sensor is positioned on the door.

U.S. Pat. No. 11,434,683B2 A side door non-contact obstacle detection system and method introduces a non-contact obstacle and gesture detection system and method. The system includes first and second electronic control units in communication with one another and obstacle and gesture sensors coupled to the first electronic control unit. The first and second power actuators are coupled to the first and second electronic control units for moving the first and second closure members, respectively. Proposed sensors are positioned on doors.

US20190128040A1 Multifunction radar-based detection system for a vehicle liftgate introduces a detection system and method of operation: operating the detection system. The system includes a power supply unit and at least one sensor for sensing at least one of the objects and the motion. A communication unit is electrically coupled to the power supply unit for communicating with a plurality of vehicle system controllers. The microprocessor is also configured to initiate the movement of the closure panel in response to processing the data corresponding to at least one of the objects and the motion.

US20210262274A1 Radar scanning system for static obstacle detection for power door movement introduces a vehicular door control system responsive to object detection, including a radar unit disposed at a vehicle that has a field of sensing adjacent to and exterior a door of the vehicle and that transmits radar signals and receives reflected radar signals representative of an object. A scanning actuator coupled to the radar unit moves the radar unit relative to the door to create a variation between the transmitted radar signals and the reflected radar signals. An electronic control unit (ECU) operates the radar unit to transmit the radar signals. While the radar unit is transmitting the radar signals and receiving the reflected radar signals, the ECU operates the scanning actuator to move the radar unit relative to the door. The radar sensor is placed on the door or more precisely on the door handle.

U.S. Pat. No. 11,465,557B2 Vehicle latch with integrated radar module introduces an electronic latch system for a motor vehicle that includes an electronic latch (e-latch) including an e-latch controller within a door of the vehicle.

U.S. Pat. No. 7,686,378B2 Power swinging side door system and method introduce an automatic swinging side door with an actuator for opening and closing the door. A controller has an algorithm for moving the actuator, a sensor for detecting an obstacle via contact with the door; and a sensor for detecting the obstacle without contact with the door.

US20220333422A1 System and method for adjusting a vehicle door relative to a vehicle body introduces a system for adjusting a vehicle door relative to a vehicle body including an electromotive adjusting device, a control device configured to control the adjusting device and receive an operating command and control the adjusting device based on the receipt of the operating command for adjusting the vehicle door. The sensor device is a radar sensor, an ultrasonic sensor, or a TOF camera device, arranged on the inside of a windowpane of the vehicle door.

JP4715910B2 An obstacle detection device introduces the obstacle detection apparatus (ranging sensor) attached to the door mirror.

U.S. Pat. No. 10,443,292B2 A non-contact obstacle detection system for motor vehicles introduces a main electronic control unit having a plurality of input-output terminals and adapted to connect to a power source having at least one non-contact obstacle sensor. The sensor is attached to the vehicle door.

CN107687298B Priority drive power side door opening/closing operation introduces a vehicle door system that includes a frameless door glass system, a powered latch, a powered door pusher, a powered door opening mechanism, and a powered door protector including a protective member movably mounted to a door structure.

CN108979440B Control method and system for automobile door introduces a control method and a system of an automobile door, wherein a speed sensor sends motion speed data of the automobile door in the process of collecting the opening and/or closing of the automobile door to a controller, a radar device sends barrier information to the controller when detecting that a barrier exists in a preset range of an automobile body, an electric stay rod sends a Hall signal to the controller. The radar device includes an ultrasonic radar and a millimeter wave radar; the ultrasonic radar is mounted on the vehicle door or the side surface of the vehicle body, the millimeter wave radar is installed on the front corner and the rear corner of the vehicle body and is used for detecting whether obstacles enter the maximum opening range of the vehicle door.

SUMMARY

The basic motivation for the invention is to provide a new generation of vehicle door protection systems providing an azimuth field of view of 180 degrees on one side, in the way that for each lateral side of the vehicle, only one radar sensor is used intentionally, without being integrated into vehicle doors. This approach allows an affordable system approach, meaning that one radar sensor is placed on one side of the vehicle and can protect two doors; it also offers an affordable maintenance approach in case of crashes and damages compared to the state of the art approach, where radar sensor is integrated into the particular vehicle door. Moreover, the proposed system utilizes a 180-degree radar sensor having a specific field of view in elevation, where one edge of the radiation diagram field of view is placed toward the horizontal range, where the maximum radiation diagram of the said radar sensor in the elevation plane is larger than 30 degrees, advantageously around 50 degrees, having an azimuth field of view of 180 degrees. The said radar sensor is performing signal processing on the module, calculating point cloud radar data, and performing AI based processing, to eliminate radar reflections from the open door. This enables having a vehicle door protection system, which requires no processing on the vehicle central processing unit and no processing on domain controllers typically used in ADAS applications, which may reduce dependences in the overall vehicle integration, whereby the state of the art, low throughput, affordable vehicle communication infrastructure, such as CAN family of protocols, can be efficiently used. Moreover, the said radar sensors can advantageously process gestures, which are needed to activate, closing and opening of the doors, without physical touching of the said doors. The gestures to be detected are specific simple movements of the arm, hands and legs on lateral side of the vehicle.

DETAILED DESCRIPTION OF THE INVENTION

Figure 1:
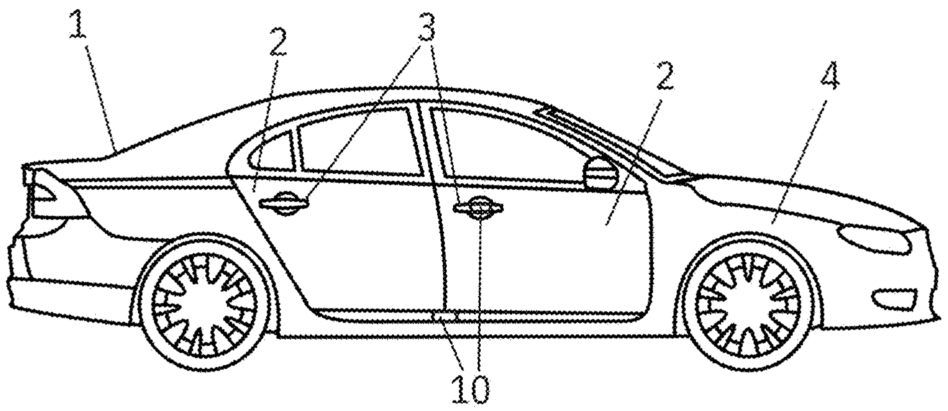
FIG. 1 shows the state of the art vehicle power door protection solution.

FIG. 1*a* shows a state of the art vehicle power door protection solution. A vehicle 1 has two doors 2, on one side 4 of a vehicle 1. A vehicle 1 can be a passenger vehicle or a commercial vehicle. State of the art solution considers that each particular door has radar sensor 10, whereby state of art radar sensor 10 is introduced, having a 120-degree field of view. The radar sensor 10 is a known solution, proposed to be located somewhere on door 2, typically in the lower part, or to be integrated into door handle 3. The radar sensor 10 tracks the position of the door and objects around it in the process of door opening. This means that one radar sensor is used for each door meaning that 4 radar sensors in total, integrated into doors, are required for a passenger vehicle solution, having two doors on each side 4. That also means, that in case of having damaged doors and their replacements, those radar sensors 10 system would increase the maintenance cost, being part of the doors.

Figure 2:
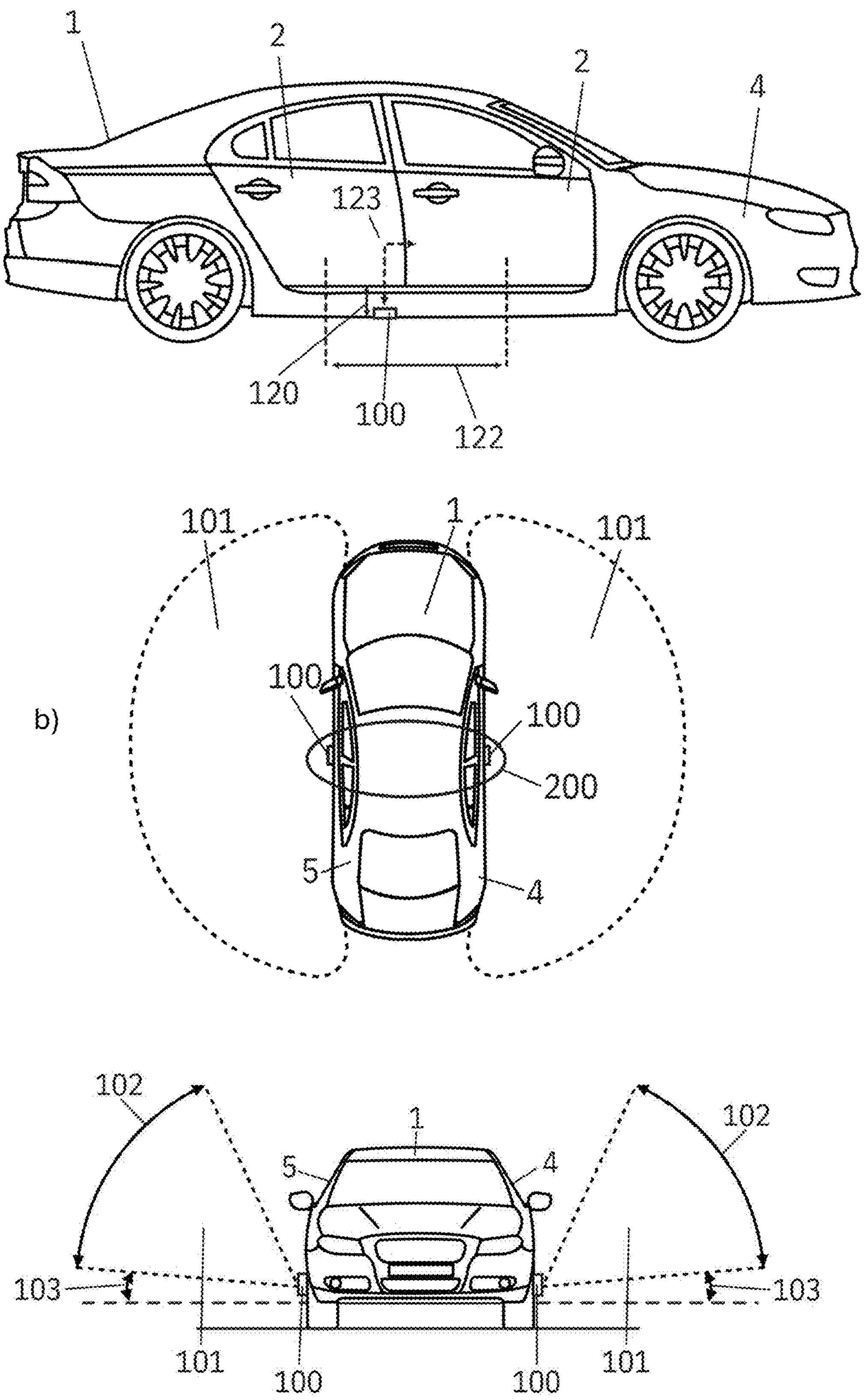
FIG. 2 shows the proposed system for vehicle power door protection solution.
Figure 3:
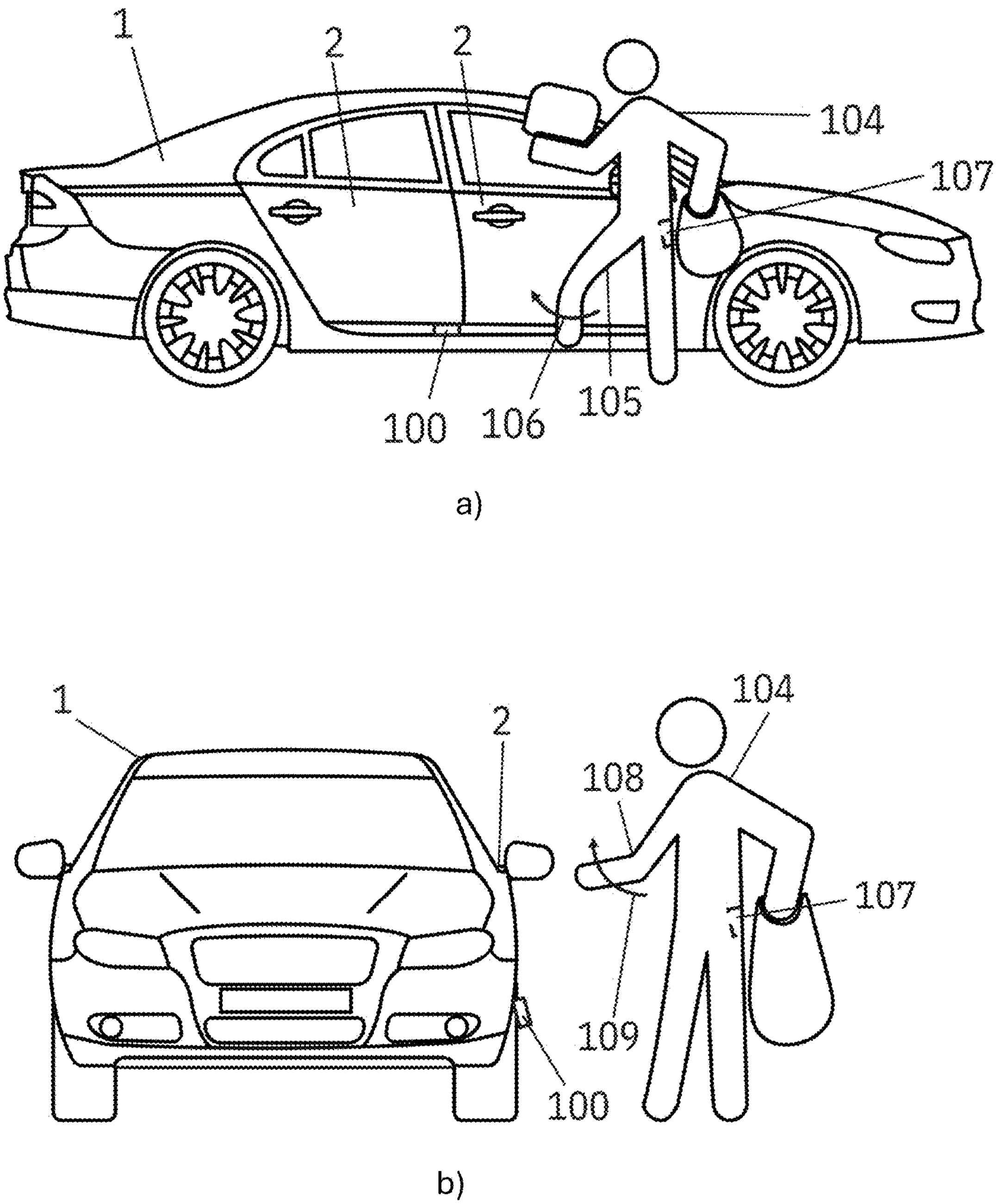
FIG. 3 shows the proposed system for vehicle power door protection solution comprising gesture control features.

The proposed innovative solution is shown in FIG. 2. In contrast to state of the art solution, only one 180-degree mmWave sensor 100 is proposed for one side 4 of vehicle 1. This sensor is responsible for controlling possible damage to door 2 of related side 4 of vehicle 1. The proposed solution requires the position of the 180-degree mmWave sensor 100 in the distance 120 smaller than 20 cm to vehicle 1 bottom, and the distance 123 smaller than 50 cm from medium distance 122, being calculated as a middle value of the door distances 121 to the end of vehicle 1. The 180-degree mmWave sensors 100, as shown in FIG. 2*b* are building the proposed system 200 for door protection. Each of said 180-degree mmWave sensors 100 have a 180-degree field of view 101, being placed on vehicle 1 first side 4 and vehicle 1 second side 4, at the positions described in FIG. 1*a*. In the front of the vehicle 1 field of view radiation diagrams in azimuth of 180 degree is shown for said 180 degree mmWave sensors 100. The main 180-degree mmWave sensors 100 radiation diagram 101 in elevation plane has around 60 degrees. The main maximum of said radiation diagram 101 in elevation is around 30 degrees, from the lower edge of the radiation diagram 101. The 180-degree mmWave sensors 100 are designed in such a way that said maximum of said radiation diagram 101 is larger than 30 degrees from the horizontal plane, or in other words, the angle 103 between the horizontal plane and the lower edge of the radiation diagram 101 is larger than several degrees. That means that the proposed system 200, having two 180-degree mmWave sensors 100, covers with a 6 dB FOV drop complete 180-degree area in azimuth and elevation area between angle 113, which is more than said several degrees and said several degrees plus 60 degrees. This innovative approach is proposed to have an affordable and effective system with maximum practical special coverage. Since the 180-degree mmWave sensor 100 is below door 4 for distance 125 and taking into account that the door length 124 is given, the angle 103 between the horizontal plane and the lower end of the field of view 101, can be advantageously calculated and applied for practical system 200 implementation, related to the particular vehicle 1. Angle 103 is ARCTAN of distances 125 and door 4 length 124, wherein the length 124 is door 4 length, where the maximum angle of the open door is 90 degrees, and if the maximum door angle is less than 90 degrees, this said is a projection and it is calculated as COS of max door 4 opening angle multiplied with door 4 length. Taking into account the case of having radar sensor at a height 5 cm less than the door 4 lower edge and having an effective maximum distance from the door 4 vertical edge to the vehicle being 90 cm, the angle 103 will be around 3 degrees. That means all low-height objects, slightly larger than 5 cm above the horizontal position of the 180-degree mmWave radar sensor 100, will be detected by proposed system 200. Those objects beyond the reach of the maximum distance 125 are not relevant. The angle 113 of the proposed system 200 is advantageously chosen to be as large as possible to enable in the elevation of the largest possible upper field of view 101 edge. For the practical point of view for addressing all of the possible cases of different vehicle 1 realization options, angle 103 can be considered to be zero. FIG. 3 shows an additional feature of realized proposed system 200, by additional SW means using the same HW constellation. The proposed digital processing functionalities 112 and 113, as an integral part of the 180-degree mmWave radar sensor 100, being part of proposed system 200, provide gesture detection features, supporting gesture feature "kick sensing" 106. "Kick sensing" 106 is being imposed by the movement of one leg of the person 104. The activation of this sensing is done advantageously when person 104 is coming close to the vehicle, having the remote key vehicle controller 107. Proposed digital processing functionalities 112 and 113, as an integral part of the 180-degree mmWave radar sensor 100, being part of proposed system 200, provide gesture detection features, supporting gesture feature "hand movement sensing" 109, being imposed by the movement of a hand one of a person 104. The activation of this sensing is done advantageously when person 104 is coming close to the vehicle, having the remote key vehicle controller 107. Digital processing functionalities of the 180-degree mmWave radar sensor 100 are then capturing the objects close to vehicle 1, and analyzing the dynamic behavior of the nearest obstacles, wherein those obstacles are leg 105 and arm 108, performing detection of the gesture features: "hand movement sensing" 109 and "kick sensing" 106.

Figure 4:
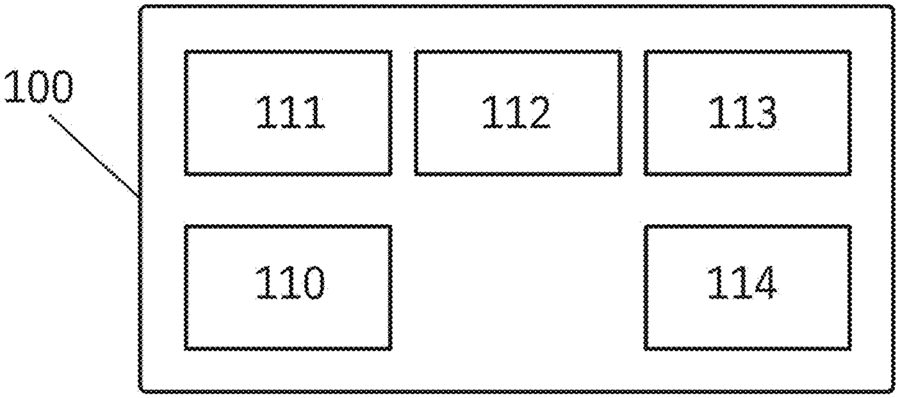
FIG. 4 shows the functional entities of the 180-degree radar sensor, being used as a main building part of the proposed system.
Figure 4:
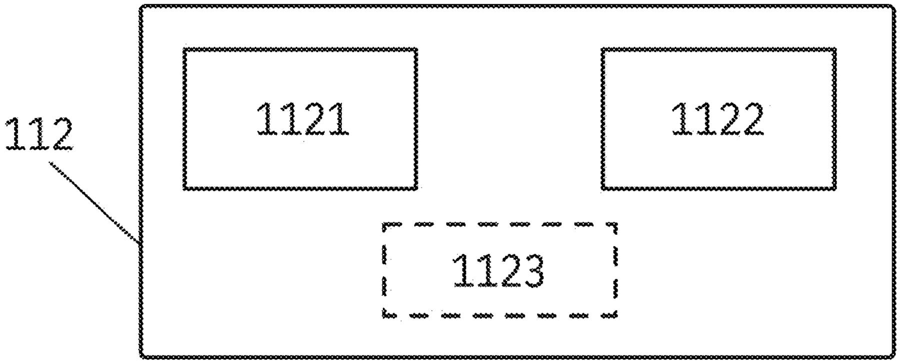
Figure 4:
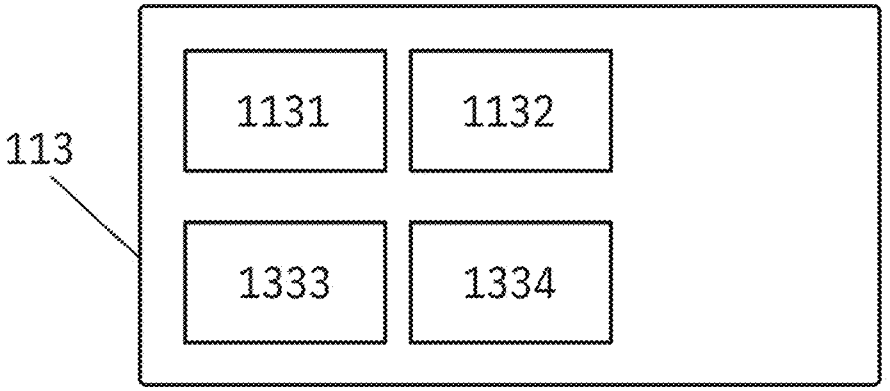

As in FIG. 4, said mmWave sensor module 100 has different functionalities, where radio part 110, contains a mmWave antenna system for receiving and transmitting mmWave signals, as well as integrated circuit functionality generation of wwWave signals and analog processing of the received mmWave signals. A digital processing part 111, also part of mmWave sensor module 100, calculates generating radar point cloud signals, where information of the object reflections within the field of view 101 is calculated, where points have information about the distance to the point, speed of the point and angle to the point. A sum of different points comes from specific larger objects, being illuminated by mmWave signals and being reflected by those signals to the antenna system of entity 110. A digital processing entity 112 uses radar point cloud information being calculated by digital processing entity 111, needed for making a decision if door 2 can be opened without being damaged, and what is the maximum opening state of door 2, without being damaged. This information is sent to entity 114, which represents an mmWave sensor module 100 interface to the vehicle infrastructure. An interface to the vehicle infrastructure uses common vehicle infrastructure communication protocols and related harnessing. Advantageously due to the full signal processing being performed on said mmWave sensor module 100, a simple 4-pin connector can be used to minimize the system cost of the proposed door protection system deployment. A common simple low-throughput vehicle communication protocol, such as CAN family of protocols, can be used. The information on blocking or limiting the opening stage of the doors, to avoid damage, is then used by a vehicle protection system and also optionally communicated to the driver over a vehicle cluster system. Entities 110, 111, 112, and 113, can be an advantageous part of the integrated mmWave silicon, as an integral part of said mmWave sensor module 100, where the antenna part of entity 110 is a separate HW part, enabling the realization of the 180-degree field of view 101.

A digital processing entity 112 is performing the calculation if the front and rear door 4 can be opened without being damaged or if they are allow specific door 2 to be opened, what is the maximum opening stage, where door 2 needs to stop to avoid being damaged. So if the request from the passengers inside vehicle 1, or by vehicle 1 controlling system, is coming to open the specific door 2 on one side 4 of vehicle 1, entity 112 is performing specific processing of the radar point cloud data. One of the important differences between state of the art solution and proposed solution 200 is that said mmWave module 100 checks the existing of dangerous obstacles in the potential opening procedures before door 2 is opened, using the practical assumption that the door opening scenario will not change in the process of opening, which brings substantial proposed system 200 cost advantage toward state of the art solution, where state of the art is disclosed in FIG. 1, having sensors in each door 2. Said radar point cloud data are acquired in frames, providing point cloud awareness in specific time steps, and more than one point cloud acquisition frame can be executed before the specific permission for door 2 opening 2 or way of maximum door 2 opening is communicated to vehicle 1 infrastructure. Due to the shorter scenery acquisition time for frames, more than one awareness situation may be executed within 500 milliseconds, which represents meaningful time, not being sufficiently long for the opening permission. This is required to ensure that some fast-moving object is not entering in the door 4 opening area. Knowing door 2 opening pattern, meaning position trajectories in opening procedures, said entity 112 calculates if particular door 2 for specific side 4 of vehicle 1, can be opened and and to which extent, without being damaged. In the digital calculation by sub-entity 1121, being part of said digital calculation entity 112, point cloud radar data are analyzed to detect the most damaging events in the following categories: other vehicle parked on the side, wall on the side, where a wall can be also arbitrary material fence or arbitrary plants arranged as a wall, a rod on the side, where a rod has arbitrary height above minimum height, and being of arbitrary material, as well as being related to a plant, where these category of the obstacles are static obstacles, defined as not moving obstacles. If the sub-entity 1121 detects non-static obstacles, in door 2 damaging areas, the second sub-entity 1122 is enabled to check if some remote obstacles in the field of view 101, have speed and direction, to enter door 2 opening area. The object tracking is part of sub-entity 1122 functionality. Optional functionality 1123 is used for classification of the changeable obstacles around the vehicles, like moving leaves of the plants, or similar soft, and also time changeable, obstacles, which may be approached by door opening differently. Sub-entity 1121 and 1122 are utilizing artificial intelligence functionality. Said artificial intelligence functionality is being previously trained by annotated radar system data, being related to said classification categories of said moving and non-moving objects. An annotated radar system data is pre-recorded and used for artificial intelligence functionality, wherein said artificial intelligence functionality uses the state of the art calculation methodologies and state of the art algorithms. The choice of the state of the art calculation methodologies and state of the art algorithms is done advantageously, with the smallest computational and memory footprints, intentionally coping with detection accuracy tradeoffs. In particular, said artificial intelligence methodology uses a combination of more than one state of the art algorithmic approach: support vector machines (SVM) with decision trees, multilayer perception (MLP), convolutional neural network (CNN) and vision transformer (ViT). All said AI approaches are being invented for video processing, wherein they are applied in proposed invention on the radar point cloud signals only, and not on video signals. Optionally, a classification information process and results can be provided over entity 114 to vehicle 1 infrastructure, and from there to the driver, to provide more comfort and potentially more safety. For example, classification results being performed by entity 1122 can be a person moving along vehicle 1 in front of door 2, and this information may be provided to the driver, independently of the driver or vehicle structure or person in front of vehicle 1, request to open door 2. Said signal processing in said entities 1211 and 1212 uses an artificial intelligence (AI) approach, with arbitrary algorithmic approaches and a multilevel (AI) approach, which is advantageously set to use the minimum of processing resources with minimum memory and processing power requirements. In an AI approach, the system is fed with training information for different classification levels, which allows an AI module to make an aimed classification. Machine learning is deployed with optional deep learning, using the neural network approach. The said training information is two-fold: defined as a set of information using actual cloud information set by numerical data: addressing ranges of length of objects, ranges of speeds of objects, and ranges of size of objects, wherein a point cloud data processing is estimating those values. Point cloud data clusters are obtained by actual, intentionally performed radar sensor measurements of objects, being part of the specific classification category.

Said mmWave sensor modules 100 have digital processing functionality 113, able to detect gestures, which can be arbitrarily pre-defined. In particular, a kick sensor 108 performed by the leg and hand gesture sensor 109 performed by the hand are pre-defined, advantageous in easy to use general intuitive manner. The initialization of the process for detecting said gesture classes is advantageously done by detecting vehicle 1 keyless entry device 107, being close to the human 104 approaching vehicle 1, as shown in FIG. 3. Said digital processing functionality 113 is capable of detecting movement of the hand, where the movement of the hand 108 is changing the angular position of the hand 108, within the specific predefined time, and specific predefined maximum and minimum angle change. Said digital processing functionality 113 is capable of detecting movement of leg 105, where the movement of leg 105 is changing the angular position of leg 105, within the specific predefined time, and specific predefined maximum and minimum angle change. Said entity 113 has sub-entity 1131, which enables starting the search for a possible gesture. Said initialization of a searching process is enabled by specific permission of the driver being in vehicle 1, by permanent initialization for observation in set time frames, or by an external to a vehicle 1 trigger. Advantageously, said entity 113 is waiting for a wireless enabling trigger coming from the keyless entry device 107 for vehicle 1, being carried by person 104, being in a title to open the vehicle 1. While using minimum power consumption, vehicle 1 is observing the existence of the keyless entry device 107 close to the vehicle, which triggers the operation of said mmWave sensor module 100 gesture sensing capability, where said mmWave sensor module 100 gesture sensing power consumption is larger than vehicle 1 sensing operation for keyless entry 107. Entity 1131 is initializing mmWave sensor module 100 sensing in the pre-defined observation areas, where the potential gesture, complying with allowed gesture detection specifications, can be expected. Entity 1132 is detecting if possible movement, in said pre-defined observation areas, have arrived in a specific pre-defined minimum and maximum position, relevant to said mmWave sensor modules 100, where the minimum and maximum position is related to a minimum and maximum distance in case of kick 106 and to the minimum and maximum angles of hand gesture 109, or combination of said angles and distances, where said observation area can be assigned to each particular door 2 on vehicle 1 sides 2. Entity 1132 is activated if entity 1131 detects the movement of the object complying with the pre-defined border and observes if related movement from one to the other said positions has minimum pre-defined position difference, which may be expressed in specific angles or a specific distance. Entity 1133 is activated if entity 1132 detects that the said minimum detection distance is achieved by object movement, and entity 1134 checks if the duration of an object movement is larger than the minimum movement duration and maximum movement duration, where said minimum movement duration and maximum movement duration are pre-set entity 1134 is activated if entity 1133 detects the compliance with said movement duration and checks if the movement duration complies with the pre-defined dynamic pattern of the movement, where the speed of the movement is analyzed, and where said change of the speed movement, or changes of the speed movement are pre-defined. Said entity 1133 enables general simple gestures on one side, and on the other side prevents false alarms in gesture sensing. Advantageously, said entity 1133 dynamic pattern is set by the user of vehicle 1, in the preferred form. Advantageously, said minimum and maximum distances, said minimum and maximum angles, said minimum and maximum gesture duration, said gesture dynamic pattern, are set by the user of vehicle 1.

Figure 5:
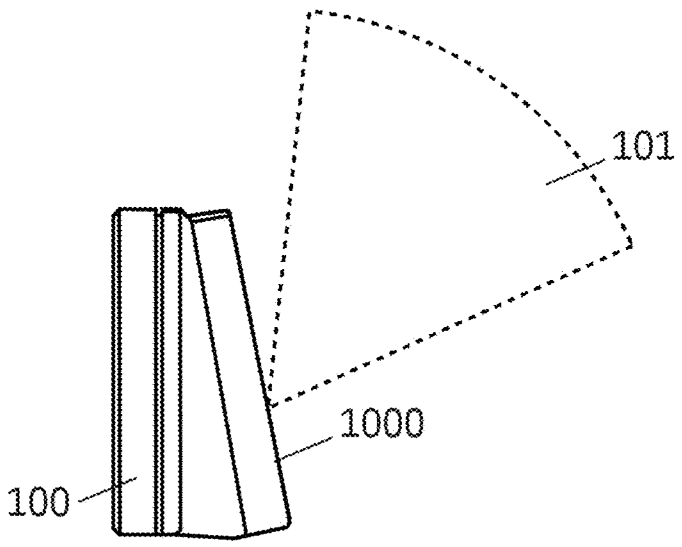
FIG. 5 shows the realization option of the 180-degree radar sensor, being used as a main building part of the proposed system.
Figure 5:
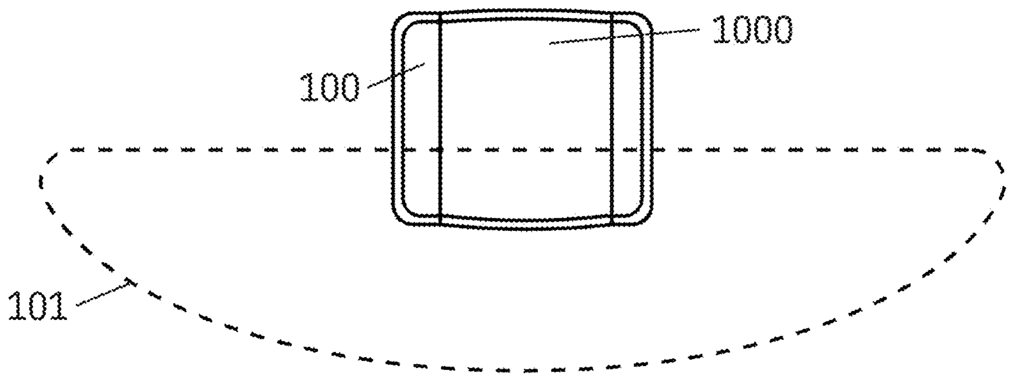

FIG. 5*a* shows a lateral view of a realization option of a mmWave sensor module 100, being part of a proposed system 200. A mmWave sensor module 100 has part of the enclosure 1000 covering the antenna system that is realized by the plurality of realization options. An antenna system is positioned with an inclination so that the radiation beam 101 in the elevation plan is positioned in the way that the lower edge of the realization beam has an angle larger toward the horizontal plane so that the maximum radiation beam has an angle larger than 30 degrees toward the horizontal plane. An antenna system is advantageously released by printed patch antenna strings for receiving and transmitting parts, being connected to the mm-wave integrated radar IC functionality. The number of patches being used in said antenna strings is larger than 0. FIG. 5*b* shows a front view of a realization option of a mmWave sensor module 100, being part of the proposed system 200. A mmWave sensor module 100 has a 180-degree field of view 101 in azimuth. The realization option with the cut cylindric shape of enclosure 1000 is observed. A cylindric shape of enclosure 1000, as one of the realization options of radiating part of said mmWave sensor module 100, enables sending and receiving mm-Waves in all azimuth directions, enabling a 180-degree field of view. Advantageously, to minimize the system cost of a mmWave sensor module 100 and therefore the proposed system 200, 4 Tx×4 Rx integrated mmWave chip of 79 GHz range is utilized, having two Tx and two Rx antenna stinges, below enclosure 1000, being positioned in one part of the 180-degree field of view, at one side of the cylindric body, and having second part of the two Tx and two Rx antenna stinges, below enclosure 1000, being positioned in the second part of the 180-degree field of view, at second side of the cylindric body 1000. The 79 GHz RF integrated sensors with 8 Tx and 8 Rx can be used to increase angular resolution, but using the same arrangement with 4 RX and 4TX antenna strings on one side below the cylindrical enclosure 1000 and second parts 4 RX and 4TX antenna strings second side below the cylindrical enclosure 1000, observing second part of the azimuth 180-degree field of view 101.

A 180-degree mmWave sensor 100 does not necessarily need to have more than a 4-pin connector to support high-speed data exchange over said entity 14, advantageously a 4-pin connector and the established state of the art vehicle network, typically realized using the family of CAN protocols, are proposed to reduce said system 200 costs. This requires less harness and less overall system cost, combined with lower maintenance costs compared to the state of the art solution.

Information about object awareness in front of door 2, obtained by the proposed system 200, can be advantageously transmitted to the cloud, using wireless means of said vehicle 1. The information from the cloud can be further processed and used for overall safety, security, comfort, and other reasons, as well as for driver behavior analysis. The information in the cloud can be further used for commercial purposes, allowing an introduction of a variety of business processes using provided data. The proposed system 200, having said 180-degree radar sensors 100, can provide parking support to said vehicle 1, advantageously and in addition to providing the vehicle surrounding awareness system. The said 180-degree radar sensors 100 can track objects such as position, speed, angle to said vehicle 1, close to said vehicle 1, so that the parking of vehicle 1 can be executed autonomously.

Further aspects and examples are found in the following numbered clauses:

1. System providing vehicle door protection, comprising of:

two mmWave radar sensor modules, each having a 180-degree field of operation, where the field of operation is defined by a 6 dB antenna radiation diagram drop, having identical hardware components, and having the same respective hardware arrangement inside the said mmWave sensor modules, and having access over the vehicle's communication network, imposing dynamic control of the mechanical functionality, which enables movement of the vehicle doors.

wherein each of said mmWave radar sensor modules is positioned in the area below vehicle doors, at a distance below 20 cm from the bottom of the vehicle, one 180-degree mmWave sensor on one lateral side of the vehicle, one 180-degree mmWave sensor on the opposite lateral side of the vehicle, both horizontally positioned and displaced less than 50 cm from the medium door distances, where the door distance is the distance from the middle of the door to the vehicle end.

wherein the radiation diagram in the elevation plane of said mmWave radar sensor modules has maximum radiation in the plane, being more than 30 degrees to the ground plane.

wherein both said mmWave radar sensor modules have digital processing hardware functionality, performing a classification of objects and their angles and their distances and their speeds, in the area which could be taken by openings of the doors on the particular side of the vehicle, where said classification of objects and their angles and distances and speeds are calculated by the processing of radar sensor point cloud data, being also calculated by said digital processing hardware functionality in each particular said mmWave radar sensor modules.

wherein said mmWave radar sensor modules having said digital processing hardware functionality, is calculating, if a said door may hit, in the process of opening, said classified object, where the process of opening is: opening start, moving of the doors and taking maximum opening position.

wherein said mmWave radar sensor modules having said digital processing hardware functionality, are calculating at what particular maximum opening angle, a said door can be opened to avoid damage of a said door.

2. System according to clause 1, wherein the said mmWave sensor modules having said digital processing hardware functionality, are capable of detecting movement of the hand, where the movement of the hand is changing distance from the hand toward said mmWave sensor modules, within the specific predefined time, and specific predefined maximum and minimum distance change.

3. System according to clause 2, wherein said mmWave sensor modules having said digital processing hardware functionality, are capable of detecting movement of the hand, where detected said distance is initiating a procedure for opening said door.

4. System according to clause 2, wherein said mmWave sensor modules having said digital processing hardware functionality, are capable of detecting movement of the hand, where detected said distance is initiating a procedure for closing said door.

5. System according to clause 2, wherein said mmWave sensor modules having said digital processing hardware functionality, are capable of detecting movement of the hand, where detected said movement direction is initiating a procedure for enlarging an opening angle of said door.

6. System according to clause 2, wherein said mmWave sensor modules having said digital processing hardware functionality, are capable of detecting movement of the hand, where detected said movement direction is initiating a procedure for decreasing an opening angle of said door.

7. System according to clause 1, wherein said mmWave sensor modules having said digital processing hardware functionality, are capable of detecting movement of the hand, where the movement of the hand is changing the angular position of the hand, within the specific predefined time, and the specific predefined maximum and minimum angle change.

8. System according to clause 7, wherein said mmWave sensor modules having said digital processing hardware functionality, are capable of detecting movement of the hand, where detected said angle is initiating a procedure for opening said door.

9. System according to clause 7, wherein said mmWave sensor modules having said digital processing hardware functionality, are capable of detecting movement of the hand, where detected said angle is initiating a procedure for closing said door.

10. System according to clause 7, wherein said mmWave sensor modules having said digital processing hardware functionality, are capable of detecting movement of the hand, where detected said angle direction is initiating a procedure for enlarging an opening angle of said door.

11. System according to clause 7, wherein said mmWave sensor modules having said digital processing hardware functionality, are capable of detecting movement of the hand, where detected said angle direction is initiating a procedure for decreasing an opening angle of said door.

12. System according to clause 1, wherein said mmWave sensor modules having said digital processing hardware functionality, are capable of detecting movement of the leg, where the movement of the leg is changing a distance position of the leg, within the specific predefined time, and the specific predefined maximum and minimum angle change.

13. System according to clause 12, wherein said mmWave sensor modules having said digital processing hardware functionality, are capable of detecting movement of the leg, where detected said movement is initiating a procedure for opening said door.

14. System according to clause 12, wherein said mmWave sensor modules having said digital processing hardware functionality, are capable of detecting movement of the leg, where detected said movement is initiating a procedure for closing said door.

15. System according to clause 1, wherein said classification of objects is performed by artificial intelligence functionality using pre-calculated point cloud data.

wherein artificial intelligence functionality is making a classification decision, being previously trained by radar system annotation data, wherein said radar system annotation data are related to the object classification categories.

wherein the object classification categories are: walls, sidewalks, vehicles, plants, rods, humans, and traffic equipment.

16. System according to clause 2, wherein said object classification categories are subtracted into sub-categories related to each of said classification categories.

17. Method according to clause 15, wherein said classification of objects is performed by artificial intelligence functionality using pre-calculated point cloud data.

wherein artificial intelligence functionality is making a classification decision, being previously trained by radar system annotation data, wherein said radar system annotation data are related to the object classification categories.

wherein the object classification categories are: walls, sidewalks, vehicles, plants, rods, humans, and traffic equipment.

18. Method according to clause 16, wherein said object classification categories, are subtracted into sub-categories related to each of said classification categories.

19. Method according to any one of clauses 17 and 18, wherein said artificial intelligence functionality uses more than one algorithmic approach: support vector machines (SVM) with decision trees, multilayer perception (MLP), convolutional neural network (CNN), and vision transformer (ViT), being applied on said radar point cloud data.

20. System according to a system any one of clauses 1 to 16, wherein said mmWave radar sensors have a 4-pin connector.

The invention claimed is:

1. A system providing vehicle door protection for vehicle doors of a vehicle, the system comprising:

two mmWave radar sensors, each of the two mmWave radar sensors having a 180-degree field of operation defined by a 6 dB antenna radiation diagram drop, having identical hardware components, and having the same respective hardware arrangement inside the mmWave radar sensors, and having access over a communication network of the vehicle, imposing dynamic control of the mechanical functionality, which enables movement of the vehicle doors, one of the two mmWave radar sensors being disposed on one side of the vehicle and the other of the two mmWave radar sensors being disposed on another side of the vehicle, symmetrically, wherein each of said mmWave radar sensors is disposed in the area below the vehicle doors, at a distance below 20 cm from the bottom of the vehicle, one 180-degree mmWave sensor on one lateral side of the vehicle, one 180-degree mmWave sensor on the opposite lateral side of the vehicle, both horizontally positioned and displaced less than 50 cm from the medium door distances, the door distance being the distance from the middle of the door to the vehicle end, wherein the radiation diagram in the elevation plane of said mmWave radar sensors has maximum radiation in the plane, being more than 30 degrees to the ground plane, wherein both said mmWave radar sensors have digital processing hardware functionality, performing a classification of objects and their angles and their distances and their speeds, in an area taken by openings of the vehicle doors on the particular side of the vehicle, said classification of the objects and their angles and their distances and their speeds being calculated by processing of radar sensor point cloud data and by said digital processing hardware functionality in each particular said mmWave radar sensors, wherein said mmWave radar sensors having said digital processing hardware functionality calculating whether or not one of the vehicle doors will hit, in the process of opening, said classified object, the process of opening being: an opening start, a moving of the doors and taking a maximum opening position, wherein said mmWave radar sensors having said digital processing hardware functionality calculate at what particular maximum opening angle one of said vehicle doors are able to be opened to avoid damage of said vehicle door, and wherein the one mmWave radar sensor on the one side of the vehicle calculates a maximum opening angle of two of the vehicle doors on the one side of the vehicle.

2. The system according to claim 1, wherein said mmWave sensors having said digital processing hardware functionality are configured to detect movement of a hand, the movement of the hand changing distance from the hand toward said mmWave sensors, within the specific predefined time, and specific predefined maximum and minimum distance change.

3. The system according to claim 2, wherein said mmWave sensors having said digital processing hardware functionality are configured to detect the movement of the hand, where said detected distance is initiating a procedure to open said vehicle door.

4. The system according to claim 2, wherein said mmWave sensors having said digital processing hardware functionality are configured to detect movement of the hand, where said detected distance is initiating a procedure to close said vehicle door.

5. The system according to claim 2, wherein said mmWave sensors having said digital processing hardware functionality are configured to detect movement of the hand, where said detected movement direction is initiating a procedure to enlarge an opening angle of said vehicle door.

6. The system according to claim 2, wherein said mmWave sensors having said digital processing hardware functionality are configured to detect movement of the hand, where said detected movement direction is initiating a procedure to decrease an opening angle of said vehicle door.

7. The system according to claim 2, wherein said object classification categories are subtracted into sub-categories related to each of said object classification categories.

8. The system according to claim 7, wherein said object classification categories are subtracted into sub-categories related to each of said object classification categories.

9. The system according to claim 1, wherein said mmWave sensors having said digital processing hardware functionality are configured to detect movement of the hand, where the movement of the hand is changing the angular position of the hand, within the specific predefined time, and specific predefined maximum and minimum angle change.

10. The system according to claim 9, wherein said mmWave sensors having said digital processing hardware functionality are configured to detect movement of the hand, where said detected angle is initiating a procedure to open said vehicle door.

11. The system according to claim 9, wherein said mmWave sensors having said digital processing hardware functionality are configure to detect movement of the hand, where said detected angle is initiating a procedure to close said vehicle door.

12. The system according to claim 9, wherein said mmWave sensors having said digital processing hardware functionality are configured to detect movement of the hand, where said detected angle direction is initiating a procedure to enlarge an opening angle of said vehicle door.

13. The system according to claim 9, wherein said mmWave sensors having said digital processing hardware functionality are configured to detect movement of the hand, where said detected angle direction is initiating a procedure to decrease an opening angle of the said vehicle door.

14. The system according to claim 1, wherein said mmWave sensors having said digital processing hardware functionality are configured to detect movement of a leg, where the movement of the leg is changing a distance position of the leg, within the specific predefined time, and the specific predefined maximum and minimum angle change.

15. The system according to claim 14, wherein said mmWave sensors having said digital processing hardware functionality are configured to detect movement of the leg, where detected said movement is initiating a procedure to open said vehicle door.

16. The system according to claim 14, wherein said mmWave sensors having said digital processing hardware functionality are configured to detect movement of the leg, where said detected movement is initiating a procedure to close said vehicle door.

17. The system according to claim 1, wherein said classification of objects is performed by artificial intelligence functionality using pre-calculated point cloud data, wherein the artificial intelligence functionality is making a classification decision, being previously trained by radar system annotation data, the radar system annotation data being related to the object classification categories, and wherein the object classification categories are: walls, sidewalks, vehicles, plants, rods, humans, and traffic equipment.

18. The system according to claim 17, wherein said classification of objects is performed by artificial intelligence functionality using pre-calculated point cloud data, wherein the artificial intelligence functionality is making a classification decision, being previously trained by radar system annotation data related to the object classification categories, and wherein the object classification categories are: walls, sidewalks, vehicles, plants, rods, humans, and traffic equipment.

19. The system according to claim 18, wherein said artificial intelligence functionality uses more than one algorithmic approach: support vector machines (SVM) with decision trees, multilayer perception (MLP), convolutional neural network (CNN), and vision transformer (ViT), being applied on said radar point cloud data.

20. The system according to claim 1, wherein said mmWave radar sensors have a 4-pin connector.

* * * * *